United States Patent [19] [11] 3,915,261
Jett et al. [45] Oct. 28, 1975

[54] SHEARABLE RATCHET MECHANISM

[75] Inventors: Marion Barney Jett, Seagoville; Dennis Mitchel Spriggs, Dallas, both of Tex.

[73] Assignee: Dresser Industries, Inc., Dallas, Tex.

[22] Filed: Sept. 9, 1974

[21] Appl. No.: 504,010

Related U.S. Application Data

[63] Continuation-in-part of Ser. No. 412,386, Nov. 2, 1973, Pat. No. 3,851,705.

[52] U.S. Cl............. 188/67; 74/578; 188/1 C
[51] Int. Cl.² ........................... F16D 65/02
[58] Field of Search........... 81/52.4 R; 188/1 C, 67, 188/82.7, 129; 192/150; 74/535, 575, 578

[56] References Cited
UNITED STATES PATENTS
1,721,227   7/1929   Manley ................... 188/67 UX
2,555,436   6/1951   Druilhet .................. 188/1 C UX Primary Examiner—Duane A. Reger
Attorney, Agent, or Firm—Michael J. Caddell

[57] ABSTRACT

A simplified and efficient dual string hydraulically actuated packer assembly is disclosed which utilizes spring-loaded, shearable, ratcheting packer lock means.

12 Claims, 41 Drawing Figures

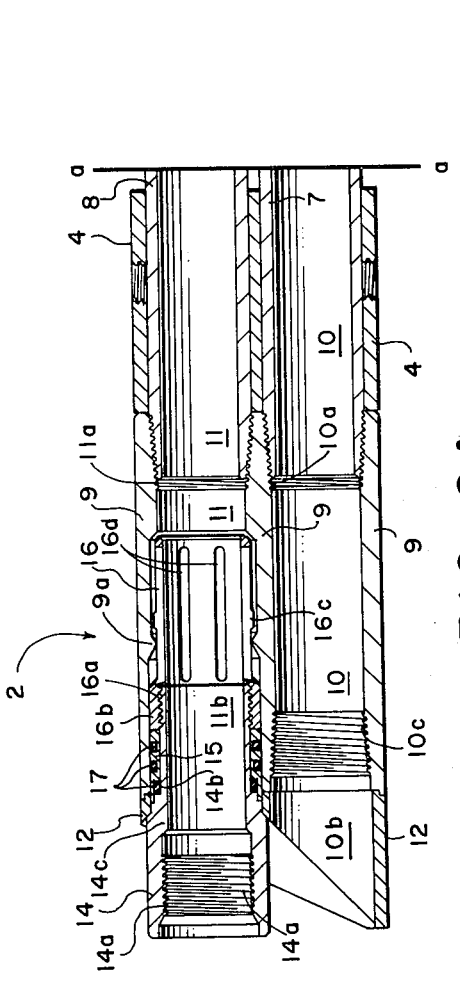
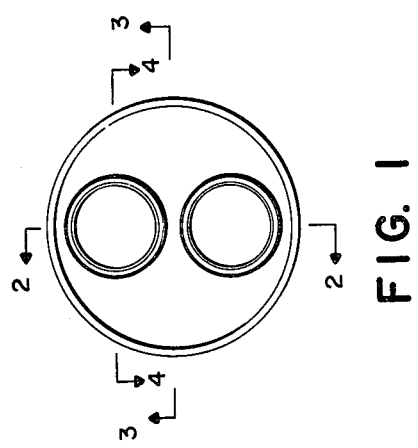
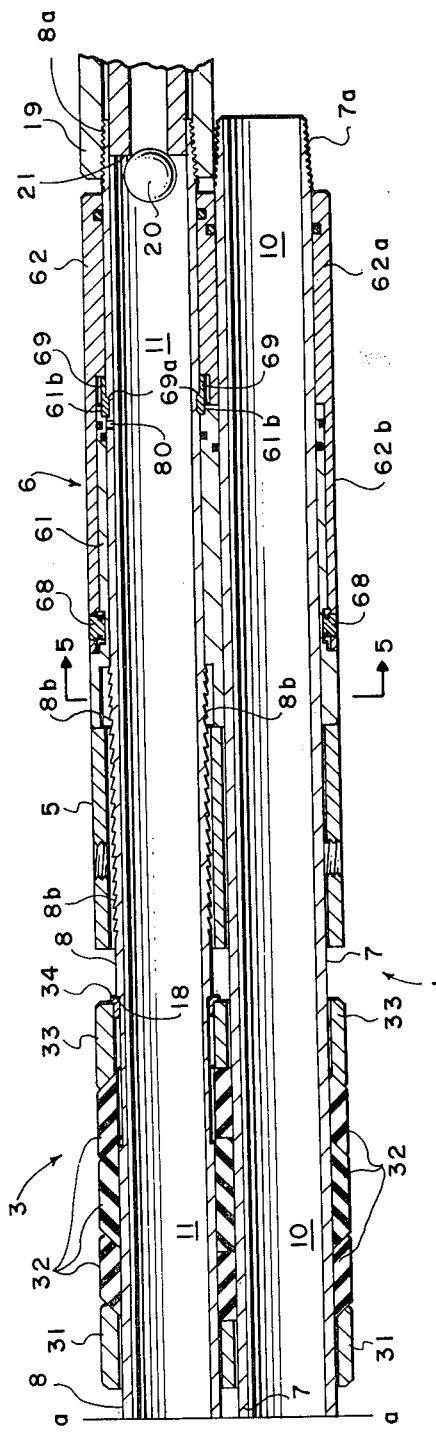

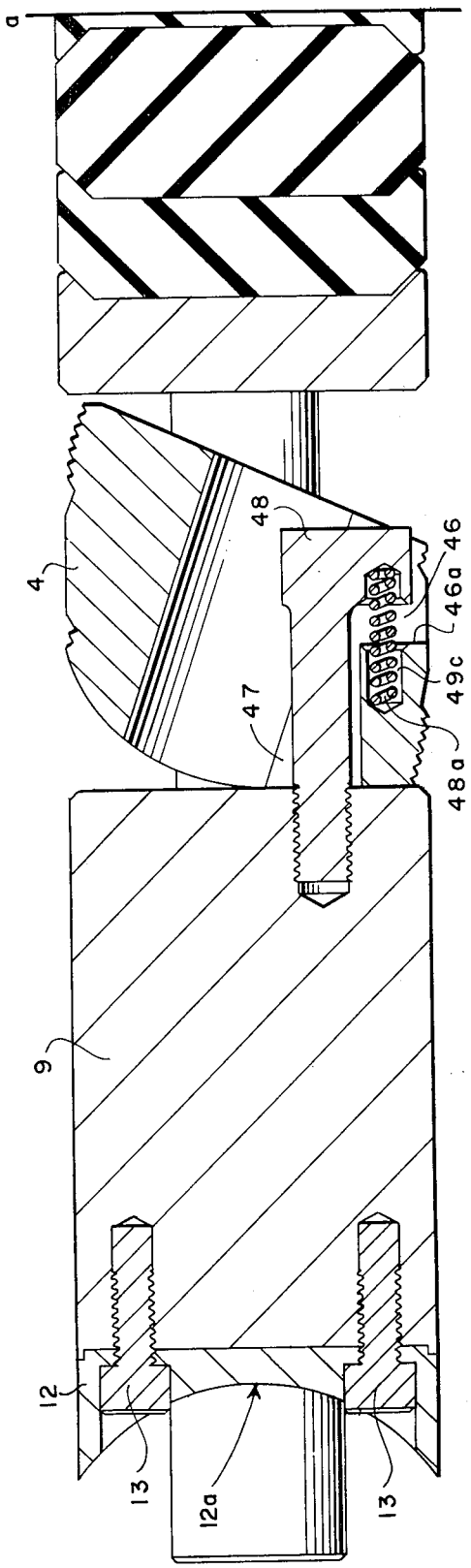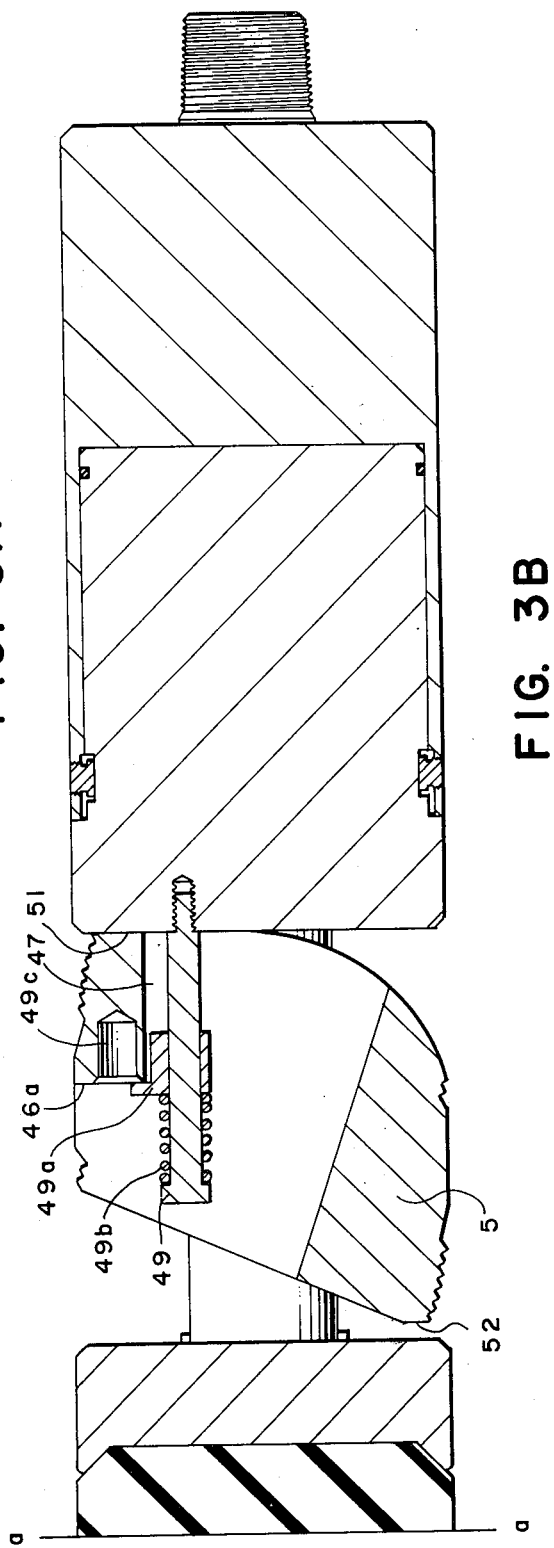

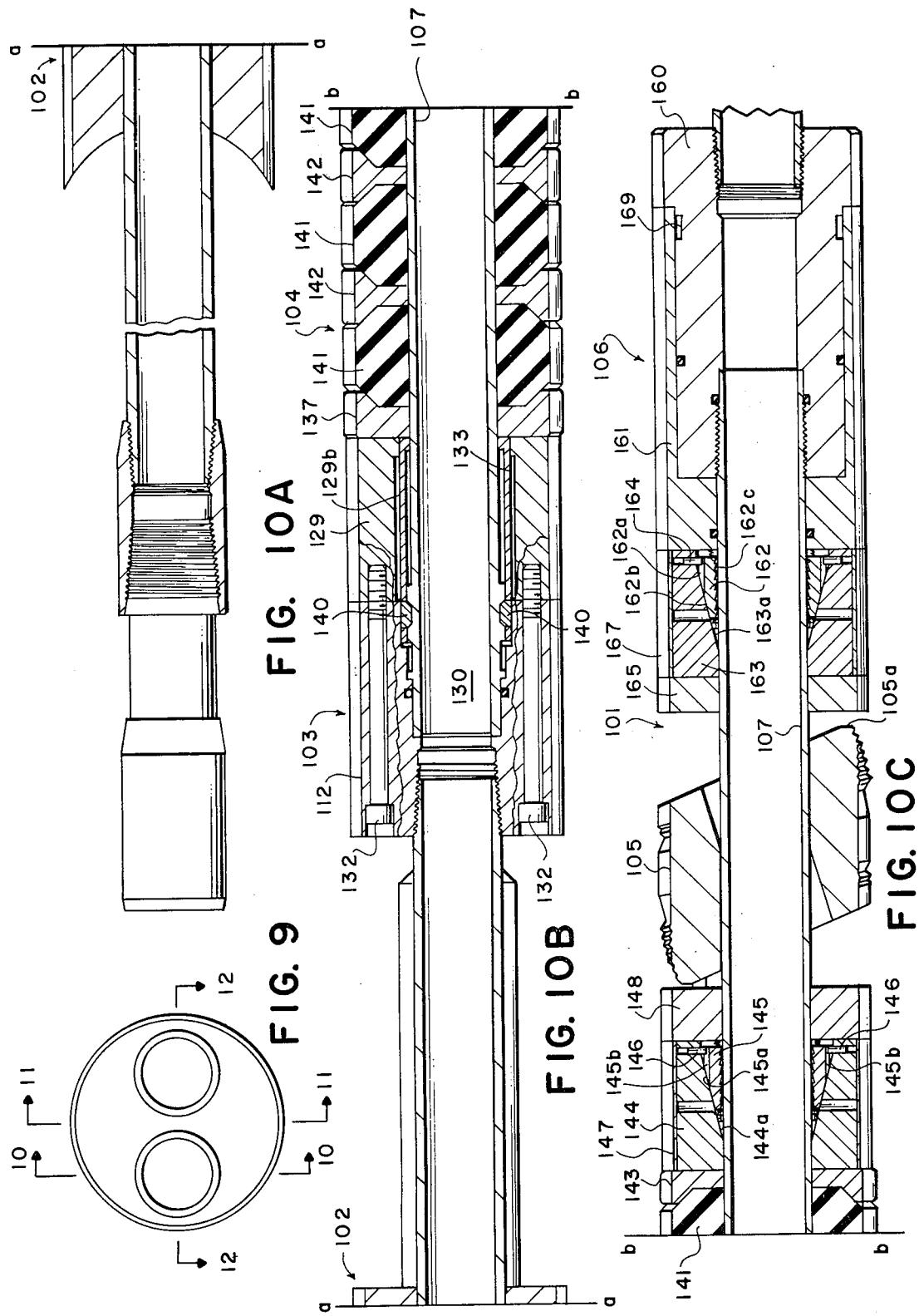

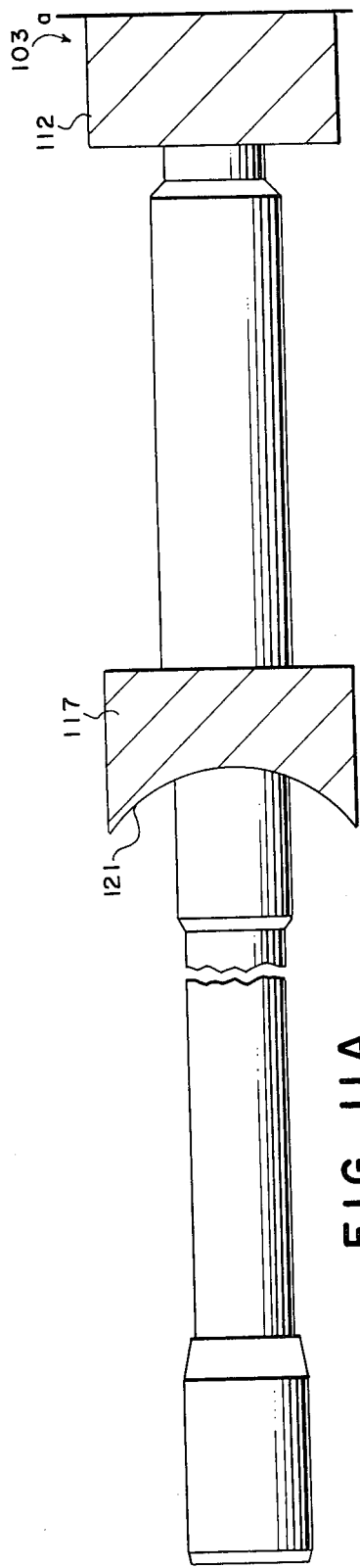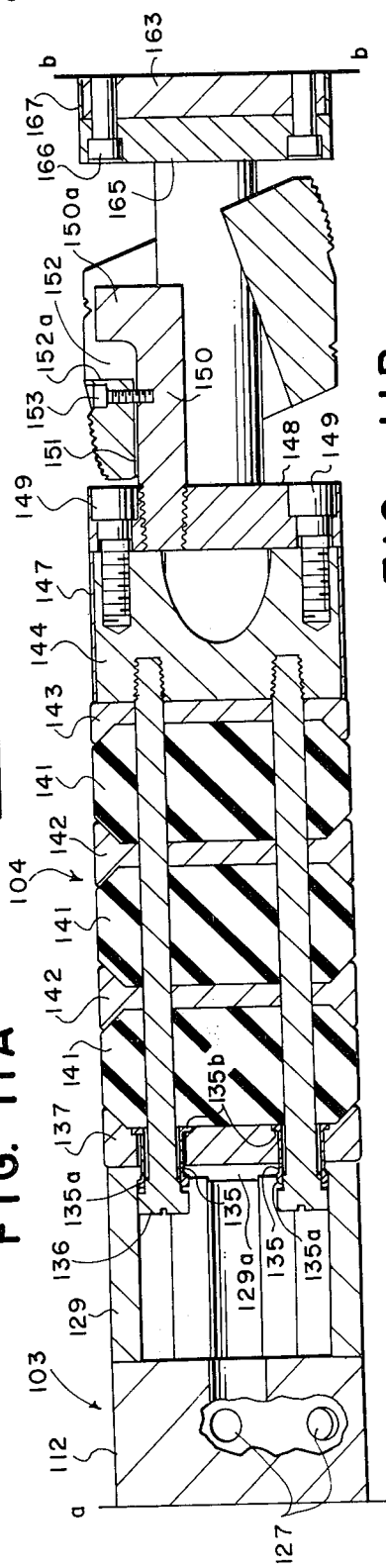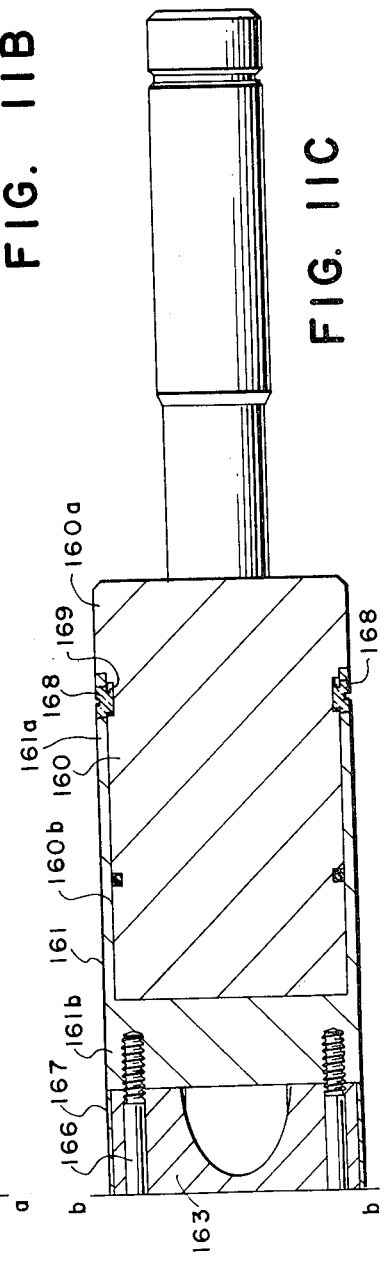

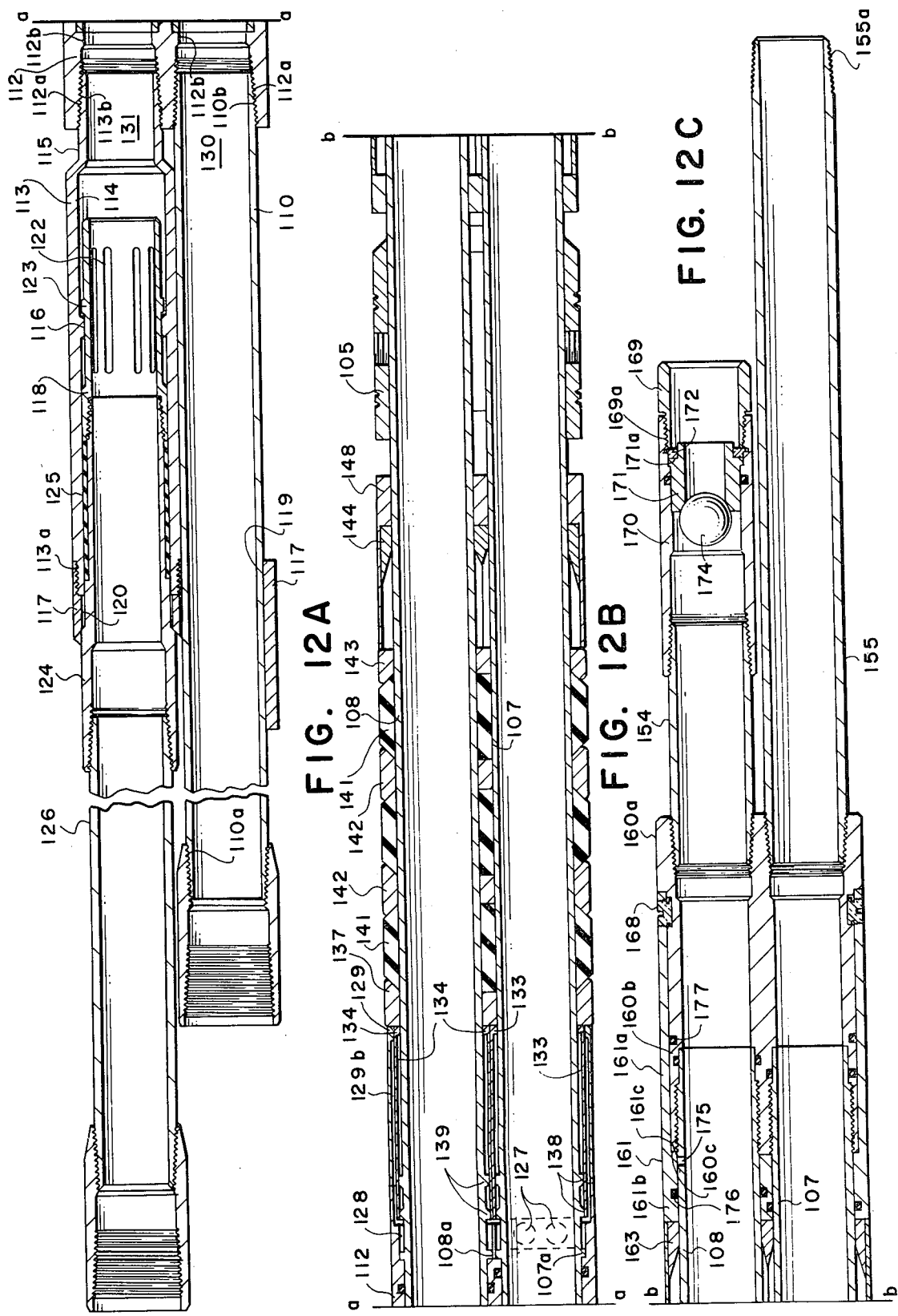

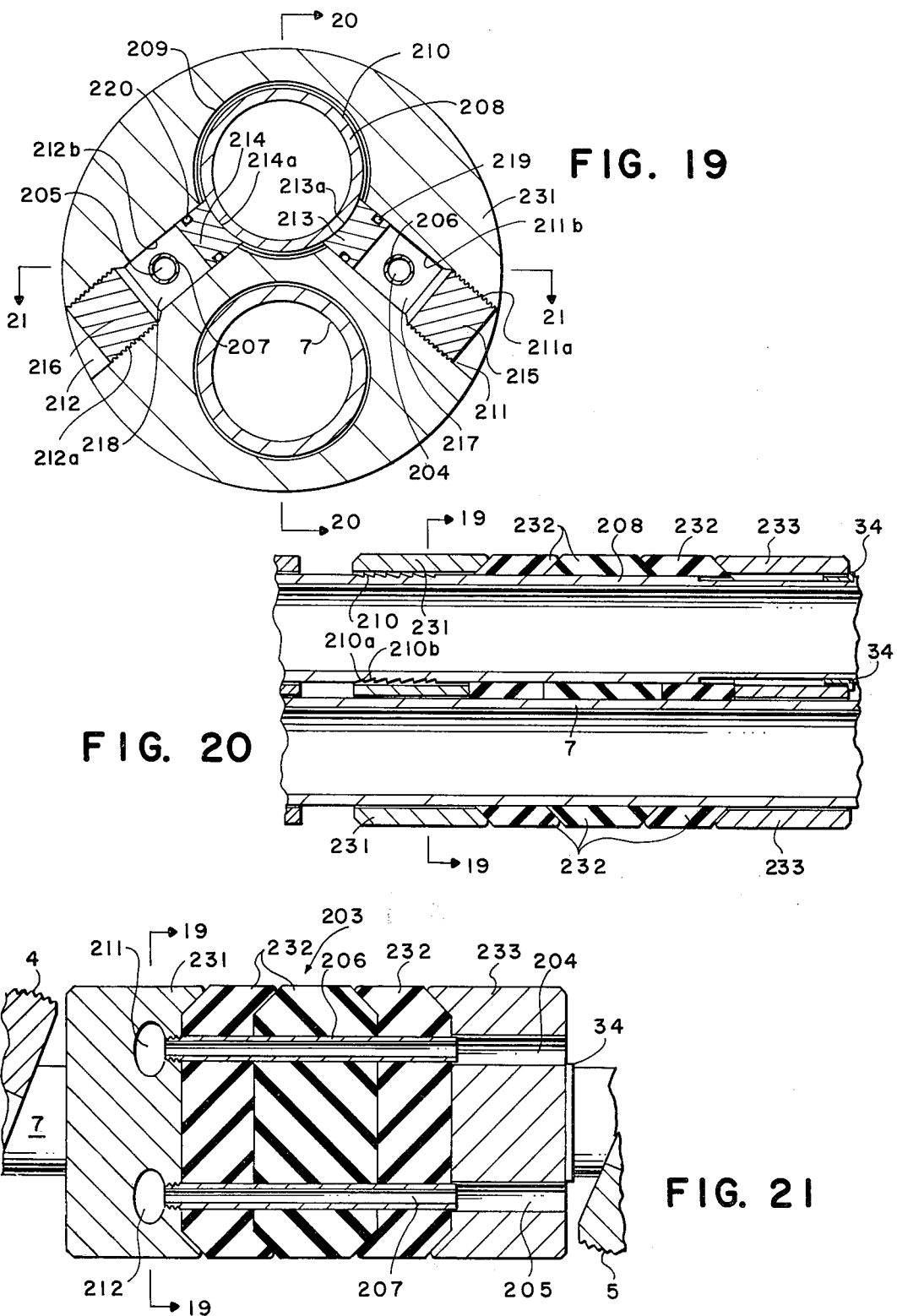

SHEARABLE RATCHET MECHANISM

CROSS REFERENCE TO RELATED APPLICATION

This application is a continuation-in-part of an original application, Ser. No. 412,386 filed Nov. 2, 1973, by Marion Barney Jett and Dennis Mitchel Spriggs, entitled "DUAL STRING HYDRAULICALLY ACTUATED OIL WELL PACKER", now U.S. Pat. No. 3,851,705.

BACKGROUND OF THE INVENTION

Often during the producing life of an oil well it becomes desirable or necessary to produce from two or more different underground formations penetrated by the wellbore. This is commonly achieved through the use of packer assemblies containing two or more strings of conduit passing therethrough.

An example of such apparatus is shown in U.S. Pat. No. 2,965,173 in which a packer apparatus having dual conduit strings passing side-by-side therethrough has located on its outer surface resilient sealing cups having outwardly flared ends which are moved into sealing engagement by fluid pressure differentials above and below the cups.

Other types of multi-string packers include the inflatable or "bladder" type such as disclosed in U.S. Pat. No. 2,991,833 and the hydraulically actuated, compressible element, multi-string packer such as disclosed in U.S. Pat. No. 3,167,127. All known multi-string packers using mechanical anchors to lock the assembly to the casing wall utilize the wedge-type slip segments having teeth which are cammed or wedged into contact with the casing wall by the action of a wedging mandrel being forced inside the slip segments forcing them outwardly into contact with the casing. Other known types of slips include the hydraulic button type which are spring-retained radial pistons slidably located in the wall of the packer body and actuated outwardly against the spring retainer by hydraulic force applied from inside the packer assembly. An example of the button type slips is shown in U.S. Pat. No. 3,311,169.

The dual-string or dual-conduit packers normally are used with a standard single string packer located on the tubing string below the dual-packer, which tubing string communicates with a lower formation below the standard packer and is connected to one conduit in the dual packer and from there to a tubing string passing to the surface. The second formation is normally located between the standard packer and the dual packer and can be produced through the second conduit passing through the dual packer and communicating with a second tubing string extending to the surface.

The disadvantages of the prior art dual string packers are their complexity, extended length, and the tendency of the wedge-type slips to become disengaged by shifting or stretching of the tubing and/or casing during the production life of the packer.

These and other disadvantages of prior devices are overcome by the present invention which comprises a dual string packer having simplified design, shortened length, and highly efficient tubular unitary slip means.

BRIEF DESCRIPTION OF THE DRAWINGS

FIG. 1 is a top view of the dual packer assembly;

FIGS. 2A and 2B comprise a lateral cross-sectional view of the assembly taken at line 2—2 of FIG. 1;

FIGS. 3A and 3B comprise a lateral cross-sectional view of the assembly along line 3—3 of FIG. 1;

FIG. 9 illustrates the top view of an alternate embodiment of the apparatus;

FIGS. 10A through 10C comprise a cross-sectional view of the embodiment of FIG. 9 taken at line 10—10 in FIG. 8;

FIGS. 11a through 11c are cross-sectional views of the embodiment of FIG. 9 taken at line 11—11;

FIGS. 12A through 12C comprise a cross-sectional view of the embodiment of FIG. 9 taken at line 12—12 of FIG. 9;

FIG. 19 is an axial cross-sectional view of a mandrel locking assembly;

FIG. 20 is a lateral cross-sectional side view of the mechanism of FIG. 19 taken at line 20—20;

FIG. 21 is a lateral cross-sectional top view of the mechanism of FIG. 19 taken at line 21—21;

DESCRIPTION OF THE PREFERRED EMBODIMENTS

Figure 4A:
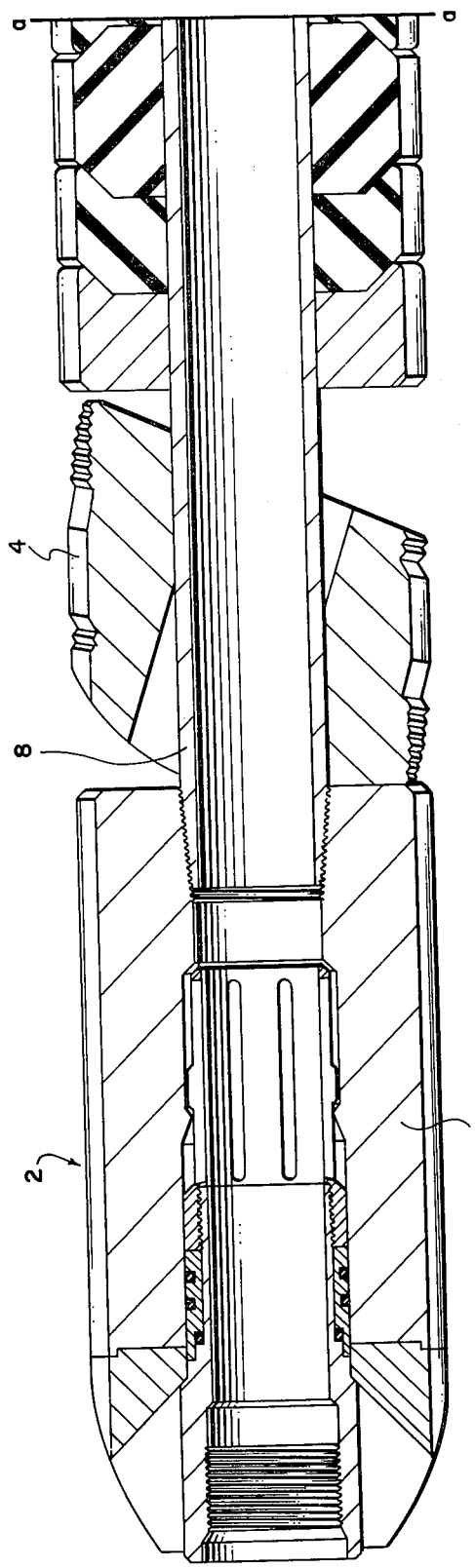
FIGS. 4A and 4B comprise a lateral cross-sectional view of the assembly taken along line 4—4 of FIG. 1.

A preferred embodiment of the invention is illustrated in FIGS. 1 through 5 in which a packer assembly 1 is comprised of an upper mandrel assembly head 2, resilient packer assembly 3, upper slip 4, lower slip 5, and piston assembly 6, all mounted more or less in encircling relationship about primary mandrel 7 and secondary mandrel 8.

The upper mandrel assembly head consists of an integral cylindrical mandrel head 9 having longitudinal parallel bore passages 10 and 11 passing therethrough having internal threaded sections 10a and 11a in which are threadedly engaged the cylindrical tubular elongated mandrels 7 and 8. A receiver collar 12 is connected by bolts 13 to mandrel head 9 and has bore passages 10b and 11b coinciding and axially aligned with passages 10 and 11 of head 9. Collar 12 has a concave cupped upper surface 12a arranged to guide a tubing string connector 14 into bore 11b of the assembly. Mandrel head 9 further has a threaded internal section 10c adapted to receive a section of conduit or tubing in threaded engagement therein.

Tubular mandrels 7 and 8, fixedly attached by threaded connection to head 9, extend in parallel relationship to the longitudinal axis of the packer assembly 1 and generally parallel to the well-bore and have bottom threaded sections 7a and 8a extending downward out of the piston assembly 6 whereby either or both may be threadedly engaged into a lower tubing string extending downward into the wellbore.

Slidably mounted on mandrels 7 and 8 are, in descending order, the upper unitary slip 4, upper packer head 31, one or more resilient packer elements 32, and lower packer head 33. Upper and lower packer heads 31 and 33 are metal cylindrical plates having a cupped surface on one side and having two axial bores therethrough for receiving mandrels 7 and 8.

Resilient packer elements 32 are made of a resilient material such as sythetic rubber and are generally cylindrical, with dual bore passages passing axially therethrough to snugly receive mandrels 7 and 8. Packer elements 32 are located in close fitting relationship with each other and with the cupped surfaces of plates 31 and 33. a flanged retainer ring 34 abutting an external shoulder 18 on mandrel 8 limits downward movement of the resilient packer assembly 3 on the mandrels by also abutting the lower surface of lower head 33.

Lower unitary slip 5 is located on the mandrels in encircling relationship about the mandrels and slidably mounted thereon; slip 5 is similar to slip 4 but is mounted on the mandrels in an inverted orientation to slip 4.

Figure 5:
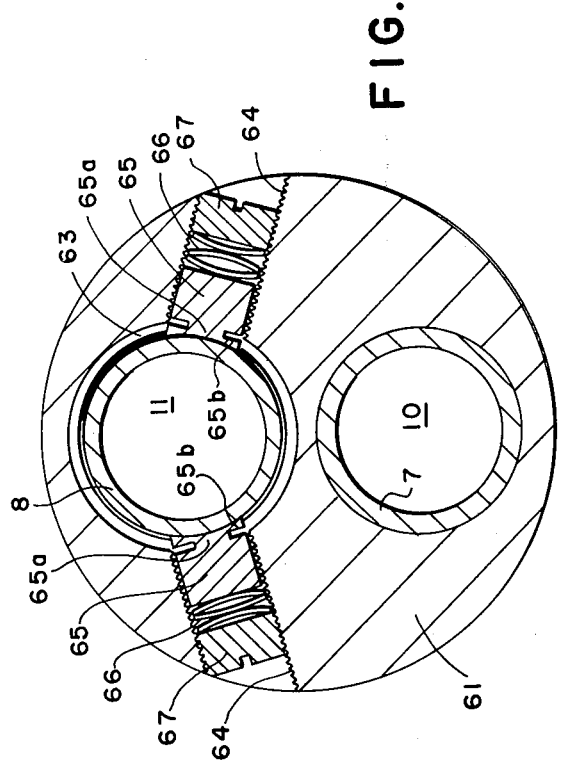
FIG. 5, shows an axial cross-sectional view of the assembly taken at line 5—5 of FIG. 2.

Piston assembly 6 is mounted on mandrels 7 and 8 in encircling relationship and consists of cylindrical setting piston 61 and cylindrical setting cylinder 62. Setting piston 61 is a substantially solid cylindrical piece having dual axial bore passages therethrough to receive mandrels 7 and 8 and an upper annular space 63 around mandrel 8. Referring to FIG. 5, setting piston 61, as shown in cross section, has a plurality of transverse lateral cylindrical bore passages 64 intersecting the longitudinal axis of bore passage 11 and having internal helical threads. Shearable cylindrical ratchet pins 65 are slidably located in passages 64 and are urged into engagement with mandrel 8 by the expansive forces of leaf, helical, or belleville springs 66 which are held in compression against pins 65 by abutting engagement with threaded plugs 67 which are snugly secured into threaded passages 64.

Figure 13:
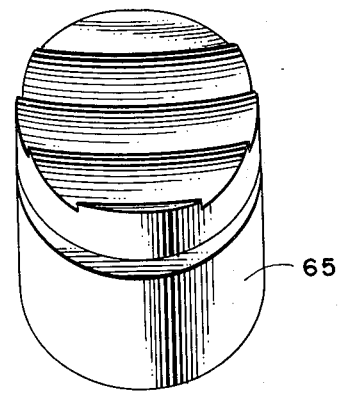
FIG. 13 is an isometric view of the shearable ratchet pins.
Figure 14:
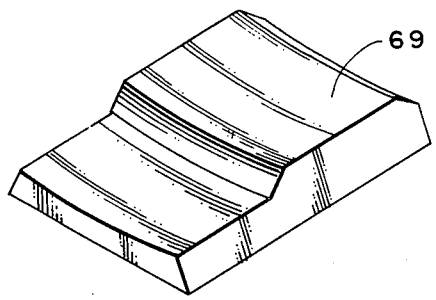
FIG. 14 is an isometric view of one of the setting cylinder releasing keys in the piston assembly.
Figure 22A:
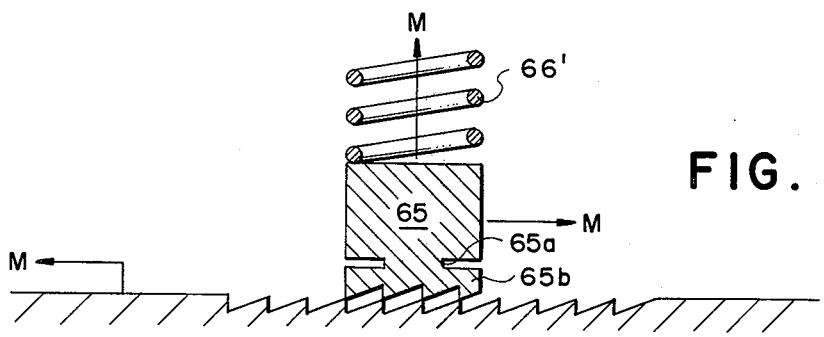
FIGS. 22a through 22e are lateral cross-sectional views illustrating the operation of the ratcheting shear screw.
Figure 22B:
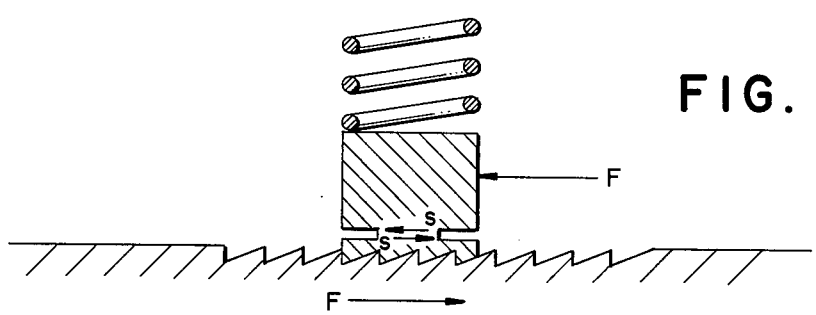
Figure 22C:
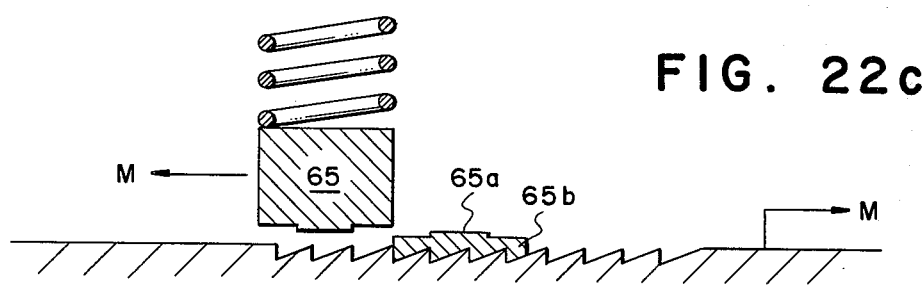

Pins 65 have a reduced section 65a designed to shear at a predetermined load and a toothed ratchet head 65b having a curved face adapted to match the curvature of mandrel 8, with a plurality of cammed teeth 65c thereon designed to match and engage external annular teeth 8b on mandrel 8. FIG. 13 illustrates a second view of the shearable ratchet pins showing the relationship of the teeth 65c on ratchet head 65b. The teeth 8b and those on head 65b are arranged to allow upward movement of the pins on mandrel 8 but prevent downward movement of the pins and thus prevent downward movement of piston 61. The cammed faces of teeth 8b and 65c allow the piston 61 to move upward by camming the pins back against the springs 66, compressing them and allowing the ratchet teeth to slide over one another. Upon attempted downward movement of piston 61 on mandrel 8 the perpendicular faces of teeth 65c abut the perpendicular faces of teeth 8b and prevent the backward motion. FIGS. 22a through 22c illustrate the steps of operation of the ratcheting shear pins 65.

In FIG. 22a the ratcheting action is occurring with the toothed member moving to the left under pin 65. A helical coil spring 66' is shown urging pin 65 downward against the toothed surface.

The angled surfaces of the teeth on the toothed surface wedge against the angled surfaces of the teeth on pin 65, camming it upward out of engagement with the toothed surface. Unlimited movement of the toothed surface is possible in this direction with respect to the ratcheting member 65. Movement of each of the elements is indicated by the arrows M.

Upon attempted movement in the opposite direction, the perpendicular faces of the coacting teeth of the two elements are engaged and relative movement in this direction is prevented. Further attempt at movement in this direciton establishes forces F in the two elements. This relationship is illustrated in FIG. 22b.

When it is no longer desirable to prevent relative movement between the two elements in this direction, the forces F are increased to the point where the resultant shear S exceeds the shear strength of the reduced area 65a and the toothed section 65b is sheared from pin 65. This situation is shown in FIG. 22c and results in unrestricted movement in either direction between the two elements.

It should be noted that the ratcheting shear mechanism herein described for use in a well packer could be adapted for other uses. The curved toothed surface of pin 65 could be made flat or of any other configuration to match the toothed surface with which it is engaged in ratcheting relationship.

Figure 22D:
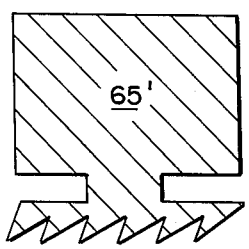
Figure 22E:
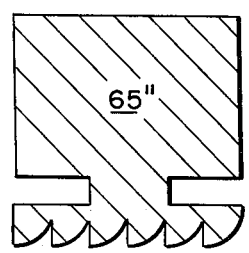

Preferably, the pin 65 is cylindrical and is slidably confined in a cylindrical bore passage but it is clear that the pin could be of other shapes and could be confined by means other than bore passages, i.e. a frame, or even rollers or other type support members. Also, where the teeth on the toothed element and the shear member 65 are illustrated as each having a perpendicular restraining face and an angled wedging face, it is illustrated in FIGS. 22d and 22e how the restraining faces could be at an acute angle to provide even greater gripping ability and the wedging surfaces could be in an arc or curved.

Setting cylinder 62 is a cylindrical element having a substantially solid lower section 62a and an upwardly extending outer collar 62'b passing exteriorly around piston 61. Lower section 62a is solid except for two longitudinal bore passages therethrough which receive in snug slidable relationship the mandrels 7 and 8. Cylinder 62 is temporarily attached to piston 61 by means of a plurality of shear pins 68 passing through upper collar 62b in threaded engagement therewith and seating in exterior channel 61a passing circumferentially around piston 61.

Setting cylinder 62 is temporarily attached to mandrel 8 by means of a plurality of curved locking keys 69 having inwardly projecting shoulder 69a thereon for engaging a matching exterior channel in mandrel 8. Keys 69 are held inward by overlapping abutment of annular shoulder 61b on the lower end of piston 61. The keys, by abutment with the grooved channel in mandrel 8, the lower end of piston 61, and the upper end of solid end 62a of cylinder 62 temporarily prevent any sliding motion of the piston assembly 6 with respect to mandrels 7 and 8. One or more ports 80 are located through the wall of mandrel 8 to communicate with the area between piston 61 and cylinder end 62a from bore 11 to release keys 69 in a manner which will be more fully described in relation to the operation of this tool.

At the lower end of mandrel 8 on external threaded end 8a is a standard threaded collar 19 attached thereto containing a valve seat 21 for receiving a fluid valve member such as a ball or plug, arranged to selectively close passage 11 to fluid flow through mandrel 8 and allow fluidic pressure to be applied through ports 80.

Figure 4B:
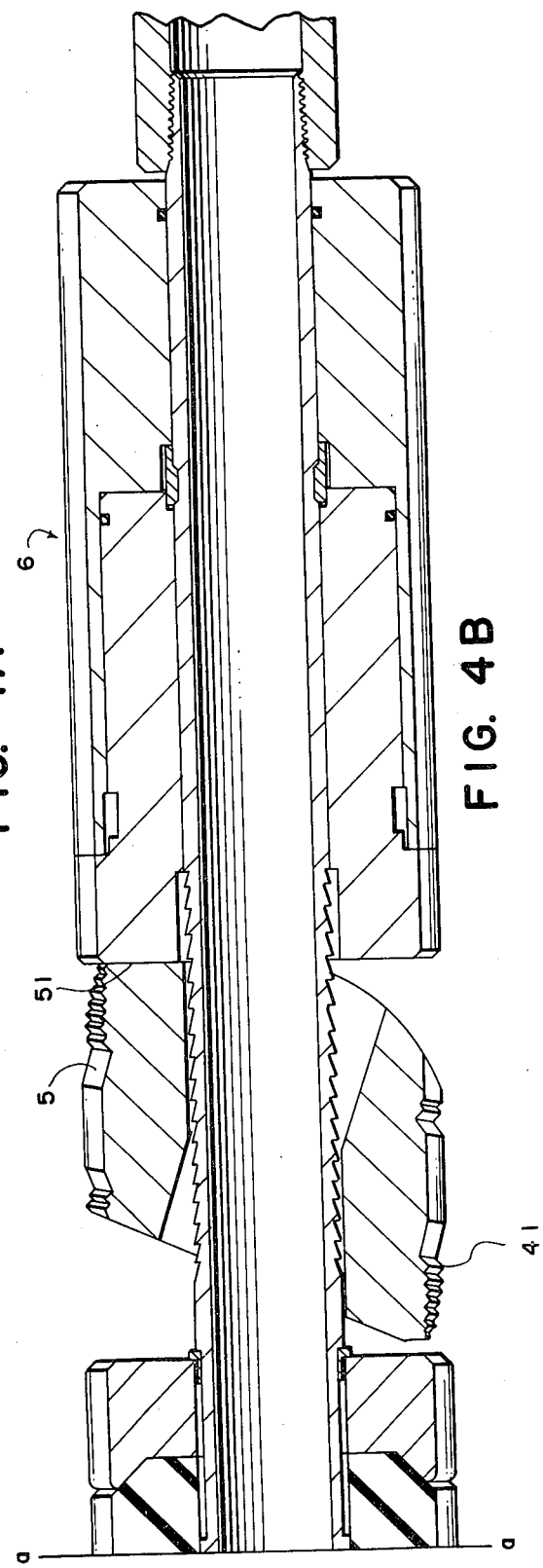

Referring specifically to FIGS. 2 and 4, the tubing string connector 14 is more particularly described as a cylindrical tubular upper sleeve 14c having internal threads 14a for engaging a standard conduit section and an annular external depression 14b for receiving a seal carrier ring 15. A lower spring collet sleeve 16 is threadedly attached at 16a to the upper sleeve 14c and has collar 16b thereon for abutting and retaining carrier ring 15 which has a plurality of circular seals 17 thereon for sealing engagement between connector 14 and head 9.

Collet sleeve 16 is temporarily restrained in head 9 by the abutment of annular exterior shoulder 16c with interior annular projection 9a in head 9. Removal of shoulder 16c upward past projection 9a can be accomplished by application of a predetermined lifting force which causes inward deflection of the shoulder 16c and allows it to move upward past projection 9a. Deflection inward of shoulder 16c is made possible by the forming of several longitudinal slots 16d in collet sleeve 16 thereby lending flexibility to the metal remaining in the areas between the slots. The amount of lifting force required to move collet sleeve 16 out of head 9 can be adjusted as desired by the number and/or width of slots 16d and/or the angle of engagement between 16c and 9a.

Figure 15A:
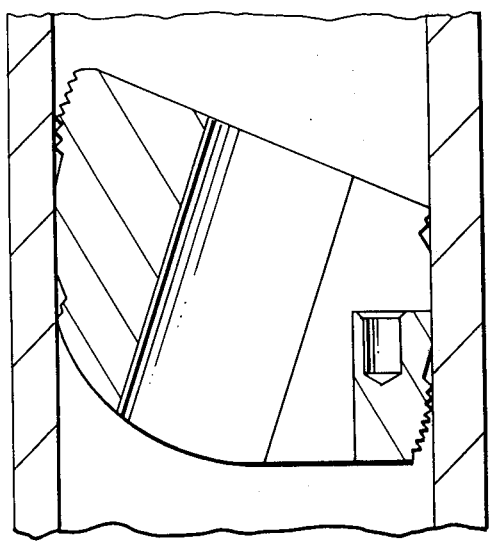
FIGS. 15a and 15b are schematic cross-sectional views of the gripping teeth on the anchor slip.
Figure 15B:
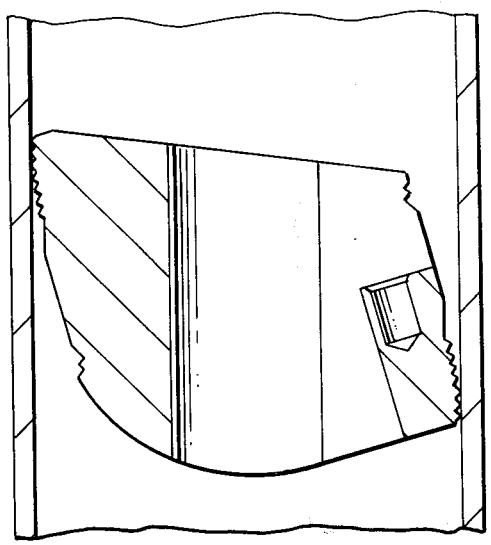

Referring now to FIGS. 6, 7, 7a, 15a and 15b, a more detailed description of the improved unitary slip members can be given. Each slip 4 and 5 comprises a generally cylindrical gripping unit having on the extended outer reaches of opposing sides a plurality of teeth 41 curved about the slip body with an axis of curvature at an angle to the central longitudinal axis of the slip member. The teeth are also arranged so that the intersection of a plane passing through the slip longitudinal axis with the teeth extreme outer tips would circumscribe a curve as shown in FIG. 15a and 15b. This is to allow the use of this apparatus in casings having varying inner diameters and obviates the need for a separate set of unitary slips for each weight rating of casing. In smaller ID casings, as shown in FIG. 15a, i.e., those of heavier weight, the two sets of teeth near the center of the slip, having the shortest distance between them will contact the casing wall with greatest area contact; while in larger ID, lighter weight casing as shown in FIG. 15b, the teeth at the two outer ends of the slip will contact the casing due to the greater distance between the upper outer teeth and the lower outer teeth.

The curved boundary tooth profile as shown in FIGS. 15a and 15b allows this versatility of use by providing greater tooth-casing wall contact area regardless of which teeth are called upon to anchor the packer assembly.

Figure 6:
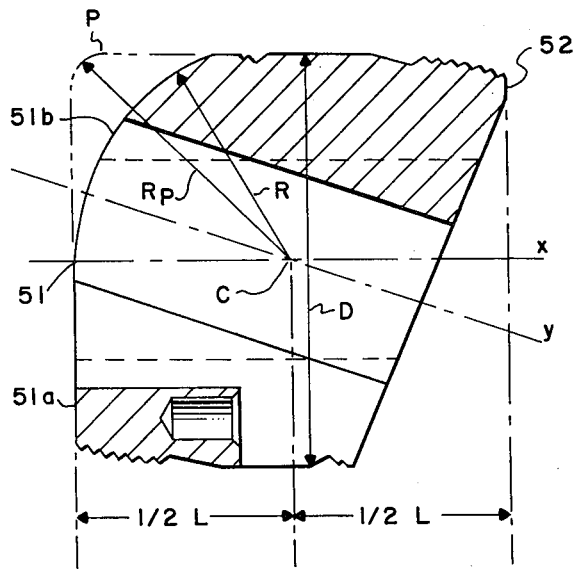
FIG. 6 is a cross-section side view of the improved unitary tubular slip.
Figure 7:
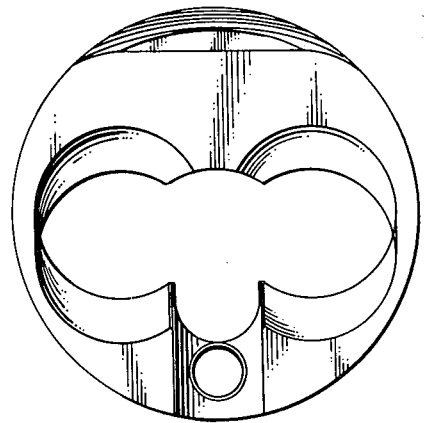
FIG. 7 is a top view of the improved unitary slip.
Figure 7A:
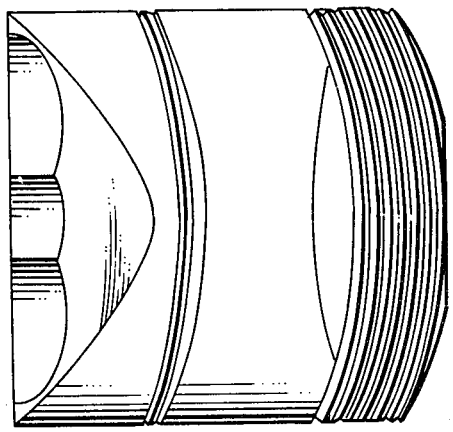
FIG. 7a is a side view of the improved unitary slip.

Looking at FIGS. 6, 7 and 7a, it is clear that each unitary slip has a dual-axis bore passage for each mandrel to pass therethrough. One axis of each bore passage generally parallels the central longitudinal axis of the slip and the other axis is located at an angle thereto in the same plane.

In FIG. 6, the intersecting bore passages are illustrated more clearly and their longitudinal axes are designated as X—X and Y—Y. This view is taken from the side with the two mandrels lying in line with one another so that only one can be seen in cross section. The axis X—X defines bore passages 43 which are shown by the dashed lines in the figure. When the slip is oriented so that the mandrels occupy these bore passages, the gripping teeth are at their innermost orientation, out of contact with the casing wall.

When the slip has been rotated to bring the passages 44 into fitting relationship with the mandrels, then the gripping teeth are at their outermost extension from the mandrels and can engage the casing wall. Bore passages 44 are shown by the solid lines in the figure.

The angle between axes X—X and Y—Y can be from five degrees up to about 35° but preferably is around 18° to 20°.

Referring specifically to FIG. 6, a significant improvement in the unitary anchor slip 5 is illustrated in the cross-sectional view which shows the abutment surface 51. This surface is at the opposite end of the slip from abutment edge 52 and provides a dual purpose surface on the slip.

Rotation of the slip into casing engagement is achieved by moving an abutment means such as piston 61 against compound surface 51 which moves the slip along the mandrel until abutment edge 52 encounters an opposing abutment surface. The resultant effect is a rotational moment established in the slip from the reactant force on edge 52. This is aided by abutment forces introduced into the slip from surface 51.

Surface 51 has been termed a dual or compound surface. This is because of the flat portion 51a and the tangentially curved section 51b joining the flat surface. The curve of surface 51b is preferably on a radius R substantially equivalent to 1/2L ½L L is the axial length of the slip along axis X—X. The curved surface is tangential to flat surface 51a at the point where axis X—X intersects the end of the slip of surface 51.

The slip is arranged to pivot about a point C located at the intersection of axes X—X and Y—Y at a distance of approximately one half of the slip length L from surface 51.

A phantom line P is drawn on the slip at the edge containing surface 51b to indicate the construction of the prior art slip means. Such a slip is disclosed in U.S. Pat. No. 3,739,849 to Robert B. Meripol. While the slip of that disclosure is a significant improvement over the art, the existence of the extended shoulder P requires significant additional apparatus in the packer on which it is used.

Primarily a significant clearance must be maintained with the prior art slip between the slip in its unset position and the lower abutment means to allow pivoting of the slip into casing engagement position. This is because the radius Rp is considerably greater than the distance ½L and therefore a minimum clearance equivalent to Rp—R must be maintained below the flat surface of the prior art slip to allow it to rotate into the set position.

To maintain the clearance and also to support the slip in a rotatable position and allow a moment force to be applied to abutment surface 52 without driving the slip downward on the abutment surface, the prior art slip was necessarily supported by pivot pins at C which passed through the slip and were engaged in an inner support sleeve. The downward force at 52 was countered by the oppositely reacting upward force of the pins on the slip which set up the desired rotational moment. The inner sleeve and pins also served to hold the slip up off of the lower abutment means so that it could be pivoted. The inner sleeve and pivot support pins are illustrated in FIG. 1 of the aforementioned Meripol patent and designated therein as 20 and 34 respectively. The clearance under the slip is not illustrated in that figure since the slip has been rotated to the engaging position.

The improved slip of this invention eliminates the need for the supporting sleeve, the pivot pins, and the pivot clearance necessary to the prior art device.

Since the radius of the curvature of surface 51b about the pivot center C is equivalent to the distance of surface 51a from C, it is obvious that the slip 5 can be pivoted about C in the same space as that occupied by the slip in the unset position. This eliminates the need for the support sleeve, the pins, and the clearance below surface 51. Furthermore surface 51 may remain in constant abutment with adjacent abutment means to provide the necessary rotational moment from forces on surface 52 which further obviates the need for support pins at C.

Another advantage of the improved slip is in the guaranteed setting of the slip. In the aforementioned patented slip, should the clearance below the slip ever be decreased due to stretching of the parts, accumulated debris in the clearance area, failure of one or more of the parts, or incorrect assembly of the tool during manufacture, to the point where the clearance is substantially less than the amount $Rp-\frac{1}{2}L$, it is clear that edge p will abut the lower surface or the debris in opposition to the setting forces at edge 52 and the desired rotational moment about C will be cancelled.

This situation is non-existent since the slip can rotate without the needed clearance and due to the simplicity of having no pins, nor sleeves; and incorrect assembly and part failure are almost absolutely eliminated.

One further advantage of the improved slip is that, when used as the lower slip, should it become lodged in the casing to the point that the releasing spring 49b hereinafter described is insufficient to rotate it out of engagement, dislodgement can be accomplished by merely bumping upward on the slip with the lower abutment means. Since some point on the curved surface 51b will be located directly below C and will receive the upward abutment it is clear that no rotational moment will be introduced into the slip, and the simple upward driving force, in addition to the disengaging force of the releasing spring 49b will dislodge the slip from the casing. The upper surface 52 will of course be free from abutment during this releasing step.

Although the slip 5 has been described above, it is emphasized that slip 4 is identical to slip 5 and operates in the same manner, and the above description appertains thereto as well. Thus it can be seen that these two side-by-side dual bore passages and the compound curved-flat abutment surface 51 allow the unitary slip to pivot about the two parallel mandrels 7 and 8 from a non-engaging position to a casing contact position without any interference between the slips and the mandrels.

Each slip also has a releasing slot 46 as shown in FIG. 3 which runs partially the length of the slip and passes through the wall thereof in a plane perpendicular to the plane of the two dual-axis bore passages and the central slip axis. A third bore passage 47 passes from the inner terminal wall 46a of the slot 46 through the slip to the opposite end. The cross-sectional view of FIG. 3 reveals the purpose of slot 46 and passage 47 to be for the location of the threaded L-shaped releasing lug 48 and release spring 48a in the upper slip 4; and in the lower slip 5, retaining bolt 49, flanged bolt collar 49a, and coil spring 49b. A spring cavity 49c is formed in each slip and a spring cavity 48b is formed in the L-shaped bolt to receive coil spring 48a. Lug 48 passes through passage 47 and is threadedly secured into the lower end of head 9. Likewise, bolt 49 passes through passage 47 of the lower slip 5 and is threadedly secured to the upper end of setting piston 61.

Figure 8:
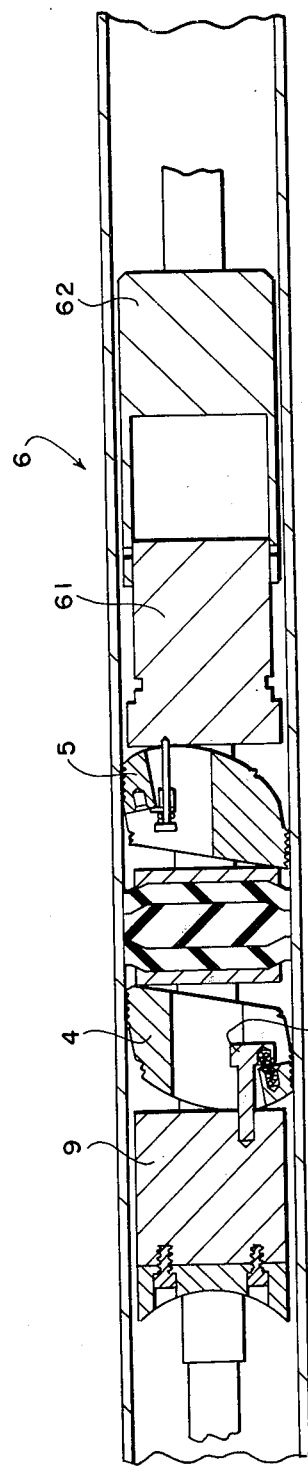
FIG. 8 illustrates a cross-sectional view of the apparatus in its engaged position.

In FIGS. 2 through 5 the packer assembly is illustrated in its unset orientation with the mandrels 7 and 8 lying in bore passages 43 parallel to the central longitudinal axis. In FIG. 8 the packer apparatus has been activated and expanded into sealing and anchoring engagement with the casing wall. In this position, the slips have been rotated to bring the mandrels into the second bore passages 44 at the angle to the longitudinal bore passages 43 mentioned above.

OPERATION OF THE PREFERRED EMBODIMENT

In a typical use of the described apparatus in a dual zone formation the apparatus is interconnected into a tubing production string by threaded connection of threads 10c and 7a to mating threads of standard tubing sections. The string will have a standard packer located in the string below this apparatus capable of sealing off the annulus between the tubing and the casing at the predetermined desired time.

The tubing string with the standard packer and the packer apparatus 1 is lowered into the well until the lower packer passes the upper producing formation and is situated between the two subject formations. The packer apparatus 1 will be located above the upper producing formation.

By appropriate means, such as manipulation of the tubing or hydraulic pressure applications, the lower packer is set in the casing. Alternately, the lower packer may be set by wireline or other means before the primary and secondary tubing strings are lowered into the hole and then the primary string can be "stung" into the lower packer. The second production string may then be lowered down the well with the connector sleeve 14 threadedly attached at the lower end. When the string has been lowered sufficiently, the sleeve 14 will engage head 9 and snap into place. The second string will then be sealingly communicating with mandrel 8 via bore 11 of head 9.

A sealing ball or plug 20 is dropped run in on a wireline, or pumped into the secondary tubing string to seal on seat 21 and allow fluid pressure to be applied to the fluid in the secondary string and act through bore 11 and ports 80 against the lower end of the setting piston 61. When sufficient pressure has been reached in bore 11, piston 61 will shear pins 68 and move upward against the lower edge 51 of lower slip 5 sliding the slip upward until upper abutment edge 52 of the slip contacts the lower edge of lower head 33. Movement upward of piston 61 on mandrel 8 is allowed by the ratcheting action of ratchet pins 65 over mandrel teeth 8b which ratchet mechanism simultaneously prevents downward movement of piston 61 on mandrel 8 under normal operating conditions.

As piston 61 moves upward in response to hydraulic pressure acting upward, the upward force is transferred to lower slip 5, and from slip 5 to packer elements 3 and into the upper slip 4. This abutment of the slips with the packer assembly serves to rotate the slips into contact with the casing simultaneously with compression of the packer elements 32. Thus, continued application of hydraulic pressure of sufficient magnitude for a short period of time will set the two unitary slips into the casing and will expand the resilient packer elements outward into sealing engagement with the casing as shown in FIG. 8.

Upon release of hydraulic pressure in bore 11, the resilient packer elements will attempt to expand longitudinally and contract radially. This will provide a constant upward force on slip 4 and a constant downward force on slip 5 maintaining them engaged in the casing. Also, ratchet pins 65 will maintain mandrel 8 telescoped within piston 61 thereby preventing the packer from unsetting should mandrel 8 try to move upward in the wellbore for any reason.

Should it become desirable to unseat the packer apparatus 1, this can be done selectively by applying an upward force on mandrel 7 and thus on mandrel 8 sufficient to shear pins 65 through their reduced area 65a. In order to prevent a bending or collapsing of shear head 65b along the gap at 65a, a relatively soft filler material such as lead or plastic can be filled in the gap at 65a to absorb the bending moment and insure proper shearing of the pins.

Upon shearing pins 65 mandrels 7 and 8 move upward with respect to the slips 4 and 5 and packer assembly 3. Releasing lug 48 will move upward and work through spring 48a to pivot upper slip 4 back to its nonengaging position, also pulling it upward off of the packer assembly 3, allowing the resilient packer elements to contract to their normal unseated orientation. Continued upward movement of the mandrels 7 and 8 will disengage the lower head 33 from abutment shoulder 52 of slip 5 allowing disengagement of the lower slip from the casing. Coil spring 49b will then expand against slip 5, thereby pivoting slip 5 into its retracted position. The packer assembly 1 is now completely unset and may be removed from the hole. The secondary tubing string may be removed from passage 11 before or after unsetting the packer assembly 1, or may be removed from the hole with the primary string if desirable.

MANDREL LOCKING MEANS FOR HIGH WELL PRESSURES

Occasionally the apparatus of this invention must be used in a well having extremely high formation pressures or used in treatments of wells whereby fluids under high pressure must be pumped into the well formations through this apparatus.

For instance, pressures below the above described packer assembly may reach the range of 5000 PSI or higher, and in this range a considerable upward force is exerted by the fluid upon the conduit strings in the wellbore, creating a bouyancy effect on the packer mandrels tending to drive them upward through the packer assembly resulting in unsetting of the slips and consequently the packer elements. This bouyancy effect is termed the "piston" or "end area" effect.

To avoid this tendency towards disengagement of the slips caused by the pipe bouyancy, a special locking mechanism is provided which is actuated by pressure below the packer elements and serves to lock the mandrels in the packer assembly.

Referring to FIGS. 19, 20, and 21 the locking mechanism is illustrated. FIG. 19 is an axial view in cross-section taken at line 19—19 of FIG. 20. In the modified embodiment, the packer assembly 3 of FIGS. 1–4 is replaced by the modified locking packer assembly 203. Packer assembly 203 consists essentially of an upper head 231, resilient packer elements 232 and lower head 233, all encircling mandrel 7 and modified mandrel 208.

Modified mandrel 208 is substantially similar to mandrel 8 except for the existence of a plurality of tooth ridges 210 formed in the outer surface of the mandrel. Each ridge 210 has an abrupt upper face 210a and a sloping lower face 210b. The angle that face 210a makes with a plane normal to the tubular axis of mandrel 208 is preferably about 10° but may vary from 1° to 40° depending upon the amount of restraining force desired. The angle of face 210a may be from 130° to about 50° with a preferable angle of around 90°. Ridges 210 preferably circle mandrel 208 entirely but this is not absolutely essential.

The packer assembly 203 contains two fluid bore passages 204 and 205 passing through lower head 233, resilient packer elements 232, and part of the way into upper head 231. The bore passages generally run parallel to the mandrels 7 and 208 and communicate with the formation annular area below the packer assembly 203.

Rigid tubes 206 and 207 line the bores through the resilient elements 232 to prevent collapse and closure of the passages upon compression and deformation of the resilient packer elements.

The bore passages 204 and 205 intersect pin channels 211 and 212 passing from the longitudinal bore passage 209 in head 231 containing mandrel 208, going radially outward from mandrel 208 through head 231 and through the outer surface of the head.

The radial passages 211 and 212 contain outer threaded portions 211a and 212a and smooth piston sections 211b and 212b. The radial passages preferably are of a cylindrical configuration for ease and convenience of manufacture but may be of any reasonable configuration.

Located slidably in piston sections 211b and 212b of the radial passages are locking pistons 213 and 214 having curved toothed faces 213a and 214a. The teeth on these faces match and complement the teeth of mandrel 208 so that full surface contact between the two sets of teeth will occur. The radius of curvature of faces 213a and 214a is substantially equal to that of the outer surface of mandrel 208.

Threaded sections 211a and 212a contain threaded plugs 215 and 216 snugly engaged therein in sealing contact, which plugs, in conjunction with pistons 213 and 214, serve to form hydraulic expansion chambers 217 and 218 in each radial passage. Circular seals 219 and 220 in the outer wall of pistons 213 and 214 serve to prevent leakage of fluid from the expansion chambers into the mandrel bore passage 209.

Operation of the locking mechanism is automatic when this modified embodiment of packer mechanism 203 is installed in the previously described packer apparatus 1, and consists of hydraulic pressure form the annular area below the packer mechanism 203 communicating through bores 204 and 205 and into pressure actuation chambers 217 and 218. The pressure is prevented from moving radially outward by plugs 215 and 216 and therefore it acts inwardly against the pistons 213 and 214 driving them against the mandrel teeth 210 thereby gripping the mandrel 208 and holding it in the packer assembly 203.

Since the packer anchors 4 and 5 are normally released by pulling upward on the tubing strings and thus on the mandrels, the angle of faces 210a on the mandrel teeth should be around five to fifteen degrees to allow upward movement of the mandrels upon application of external lifting force on the mandrels. Also, the pressure area of piston faces 213 and 214 may be designed so that the gripping force of the piston teeth on the mandrel teeth is just equal to or slightly greater than the bouyant upward force on the mandrels so that little additional upward lifting of the mandrels is required to wedge the piston teeth out of engagement with the mandrel teeth when unsetting the packer to remove it from the wellbore.

It should be noted that the back or lower edges 210b of the mandrel teeth are at a relatively flat angle compared to the upper faces 210a so that movement of the upper head upward on the mandrels is hardly impeded.

In addition to the hydraulic force on pistons 213 and 214 it is clear that any known spring means such as coil springs could be compressed and placed in chambers 217 and 218 to supplement the actuating pressure.

ALTERNATE EMBODIMENTS

Referring now to FIGS. 9 through 12 and 16 through 18, an alternate embodiment of the invention is disclosed which utilizes a single unitary slip or anchor capable of anchoring the assembly in the casing against upward and downward forces and pressures.

The packer apparatus 101 essentially comprises upper connector assembly 102, upper head assembly 103, packer assembly 104, unitary slip 105, and piston assembly 106.

The upper connector assembly 102 features a primary tubing receiver 110 which is an elongated tubular member having external threads 110a and 110b at its upper and lower ends and containing a connector collar 111 threadedly attached to threads 110a and arranged to be interconnected into a standard tubing string. Tubing reciever 110 is threaded into upper head 112 which also receives in threaded engagement a tubular elongated secondary tubing string receiver 113. Head 112 is primarily a cylindrical member having dual bore passages passing therethrough oriented substantially parallel with the central longitudinal axis of the cylindrical member. The upper portions of the dual bore passages have internal threads 112a for receiving tubular sections 110 and 113.

Tubular receiving member 113 has an enlarged chamber area 114 attached to a standard tubular section or neck 115 and containing an annular inwardly projecting shoulder 116. Threadedly attached to the upper end of member 113 at threads 113a and slidably encircling member 110 is upper receiver dish 117 which is a generally cylindrical section having a concave upper face 121 and dual bore passages 119 and 120 to receive member 110 and the secondary tubing string collet sleeve 118. Collet sleeve 118 is a tubular member having an annular shoulder 123 sized to abut shoulder 116 and be retained thereby. Longitudinal slots 122 are formed through the wall to give the remainder of the sleeve flexibility and allow shoulder 123 to flex inward and traverse shoulder 116. A cylindrical, tubular seal carrier collar 124 is threadedly attached to sleeve 118 and contains seal elements 125 encircling thereon to seal against bore 114 of receiver 113. A standard length of tubing 126 can be threadedly attached into collar 124.

Upper head 112 contains inner annular abutment ridges 112b in bore passages 130 and 131 to receive in snug fitting relationship the primary and secondary mandrels 107 and 108 which mandrels are elongated cylindrical tubular members extending substantially through the entire tool.

Each mandrel 107 and 108 has an annular exterior shear shoulder 107a and 108a for abutment with and selective shear means for shear screws 127 which project through the wall of head 112 and into the shear chamber 128 formed between head 112, shoulders 107a and 108a and mandrels 107 and 108.

A cylindrical abutment shell 129 is secured to head 112 by threaded bolts 132 passing through the head and threadedly engaging shell 129 as shown in the discontinuous cross-sectional view of FIG. 9. This cross section must be shown in broken or disontinuous section in order to show the bolts since a normal cross section at line 10—10 of FIG. 9 would not clearly show them.

Figure 11D:
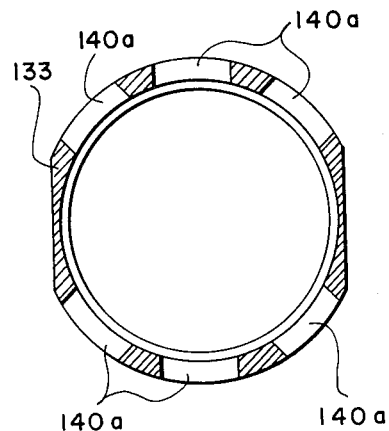
FIG. 11d is a cross-sectional axial view of a key retaining sleeve.
Figure 11E:
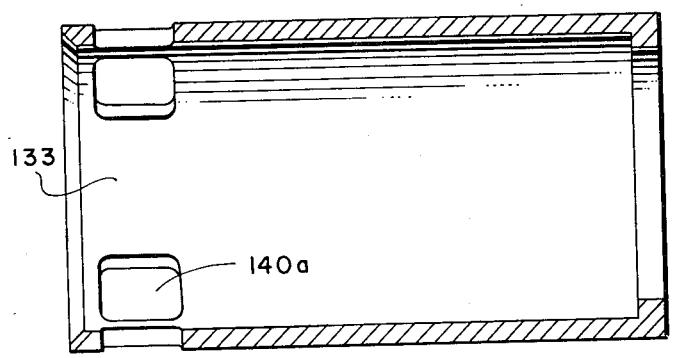
FIG. 11e is a side cross-sectional view of a key retaining sleeve.

Located axially within shell 129 are two parallel locking-key retainer sleeves 133 and 134 which are relatively thin cylindrical sleeves having flats milled along diametrically opposing sides and placed side by side slidably telescoped over mandrels 107 and 108. The milled sides are shown in cross section in FIG. 12 and the normal sides are shown in FIG. 10. FIG. 11d shows a cross-sectional axial view of one of the key-retaining sleeves 133 and 134, and FIG. 11e shows a cross-sectional axial view of a sleeve.

Figure 11F:
FIG. 11f is an axial end view of a retaining key.

Shell 129 also consists of a thick wall area and a thin wall area as shown in FIGS. 11 and 12. The narrowed walls of shell 129 and of sleeves 133 and 134 are to allow side by side placement of the two mandrels 107 and 108 within the dimensions of the sleeves and the shell. Shell 129 has at its lower end an inwardly projecting flange 129a through which pass locking collet sleeves 135 and packer assembly bolts 136 concentrically located within sleeves 135.

Sleeves 135 each have a small spring lip 135a on the outer edge of the upper end for engaging flange 129a and an outer abutment flange 135b at the lower end for abutment and retention of upper packer plate 137 to head 112. This prevents head 112 from floating upward on bolts 136 away from plate 137 and prematurely shearing of screws 127 while going in the hole with the tool.

Key-retaining sleeves 133 and 134 are arranged so that slots in the sleeves are located directly over parallel, exterior circumferential ridges 138 and 139 on mandrels 107 and 108. Retaining keys 140 are snugly fitted within the slots and abut the mandrels between the ridges as shown in FIG. 9. This arrangement temporarily locks the mandrels to the upper head assembly 103 by means of keys 140, ridges 138 and 139 and sleeves 133 and 134 and allows the operator to pick up on the string and reciprocate it to dislodge sediment or other material which may be binding between the tool string and the casing while going in the hole. This protects shear pins 127 from premature shearing. Keys 140 are held within the slots in sleeves 133 and 134 by abutment with the inner wall of the lower extending portion of head 112. FIGS. 11a—11c give views of the sleeves and keys disassembled from the apparatus for a better understanding of their structure.

The resilient packer assembly is located slidably about the mandrels 107 and 108 below upper packer plate 137 and consists of resilient packer elements 141, rigid spacer plates 142 and lower packer plate 143.

A dual wedge-cone head 144 is abutted against lower plate 143 in encircling relationship about mandrels 107 and 108 and wedge anchors 145. Anchors 145 are wedge shaped inserts having a plurality of angled gripping teeth on their inner surface contacting the outer wall of the mandrels.

Figure 16A:
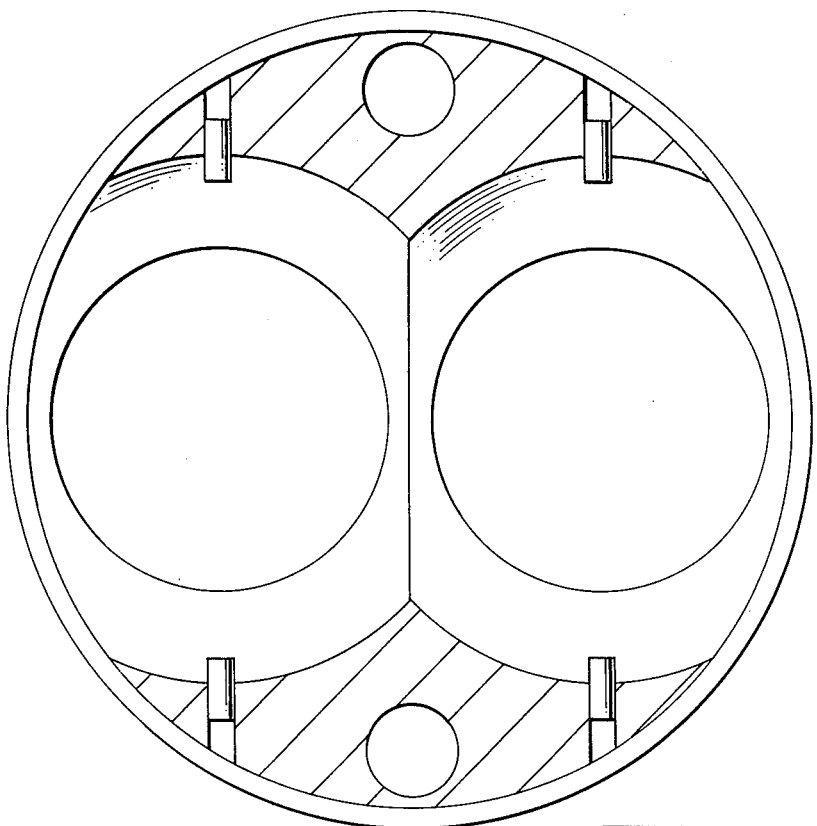
FIGS. 16a and 16b show axial and radial cross-sectional views of the wedge-cone heads disassembled from the apparatus.
Figure 16B:
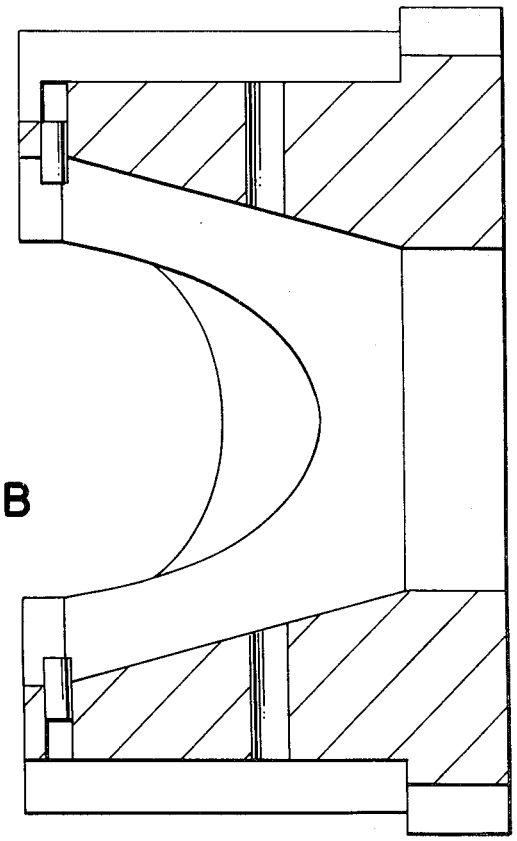
Figure 17:
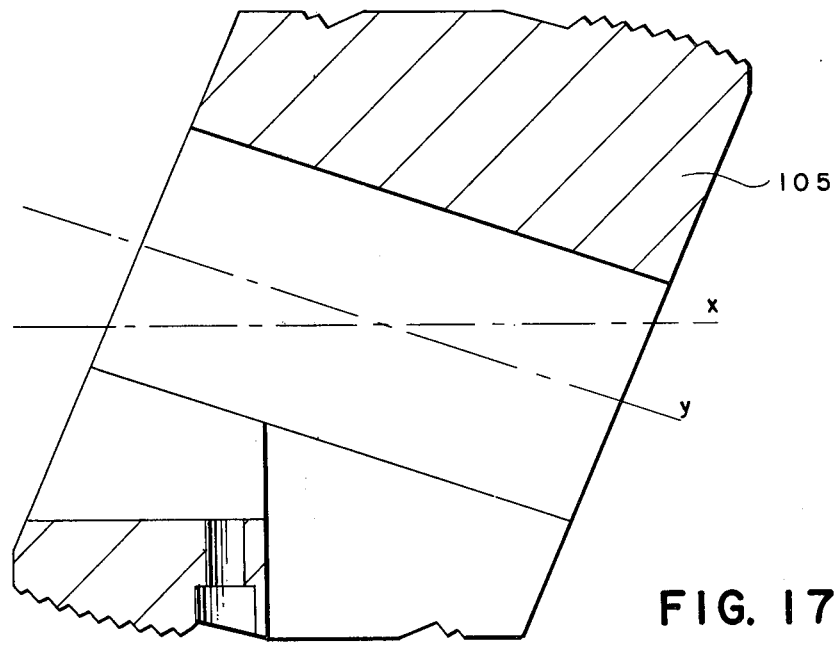
FIG. 17 illustrates a cross-sectional view of the slip of the second embodiment.
Figure 18:
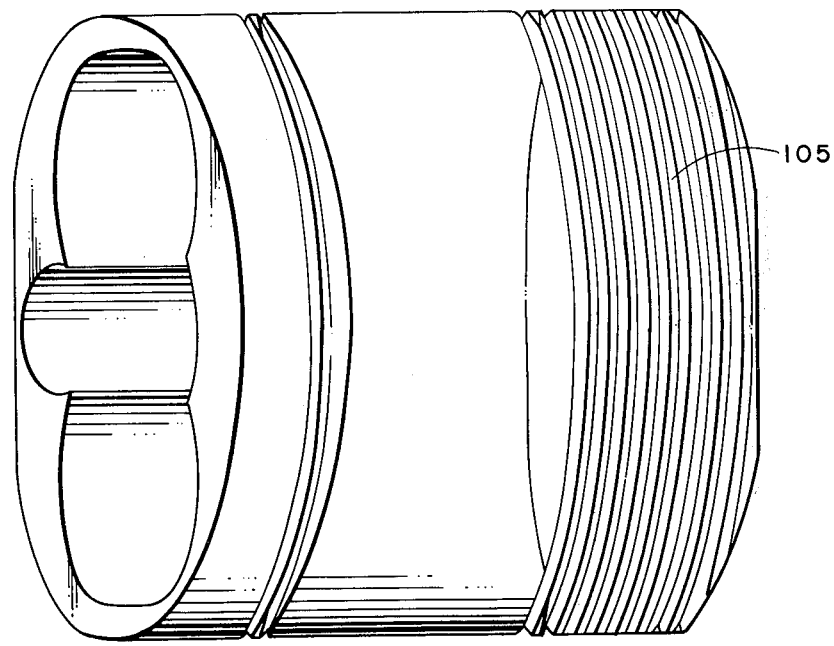
FIG. 18 shows a side view of the slip of FIG. 17.

Movement upward of the anchor inserts 145 on the mandrels is possible because of the angle of the upper faces of the wedge teeth but movement downward on the mandrels is prevented by the perpendicular teeth face projecting into the mandrel surface and also because of the wedging force inward imposed by the action of the wedge-cone head 144. It is clear that the angled inner surface 144a of head 144, acting on the angled outer surface 145a of the anchor 145 as the anchor moves upward, will result in a pressing inward of the anchor insert upon the mandrel it contacts thereby preventing downward movement of the mandrel. A more detailed view of the dual wedge-cone head 144 is shown in FIGS. 16a and 16b.

Guide pins 146 project through head 144 and into slots 145b formed in the outer portion of wedge inserts 145 to prevent the anchors from rotating around on the mandrel and getting out of optimum gripping position which is with each anchor diametrically opposed to another anchor about the mandrel.

A thin cylindrical retaining sleeve 147 snugly encircles head 144 and abuts lower plate 143 and cylindrical anchor cap 148 which is slidably aligned on mandrels 107 and 108 and fixedly secured to wedge head 144 by threaded bolts 149.

Bolts 136 also pass through the resilient packer assembly 137, 141, 142, 143 and bolt into head 144 thereby joining together the entire packer assembly 103.

A dogleg bolt 150 is threadedly engaged in cap 148 and extends through a grooved channel 151 in slip 105 with a dogleg extension 150a extending radially outward into opening 152 in slip 105. The dogleg extension is designed to be able to abut upper shoulder 152a in opening 152 and apply upward force to the releasing side of slip 105.

A shear screw 153 passes through slip 105 and is engaged in bolt 150 to prevent premature setting of the slip and also allow a certain preselected amount of compression be applied to the resilient elements 141 before the unitary slip 105 is anchored in the casing.

Located concentrically about the lower portion of mandrels 107 and 108 is the piston assembly 106 which comprises a cylindrical elongated piston 160 having a cylindrical lower head 160a threadedly attached to bottom tubing adapters 154 and 155 and a reduced diameter upper head 160b threadedly attached to the lower ends of mandrels 107 and 108. Also in the piston assembly 106 is a piston cylinder 161 having a skirt 161a passing slidably and concentrically over upper head 160b and also having an upper head 161 abutting the upper head 160b of piston 160. A wedge assembly similar to that at 144 and 145 is also slidably located in the piston assembly 106 and consists of a plurality of wedge anchors 162 slidably and wedgedly held in a dual conical wedge head 163 with guide pins 164 passing through head 163 and engaging in slots 162a located in anchors 162. Anchors 162 have a conical wedge surface 162b along their outer periphery for camming engagement with conical inner surface 163a of head 163 and further have gripping ratchet teeth 162c on their inner surfaces for one-way gripping of mandrel 107. It is clear that anchors 162 will allow upward movement of cylinder 161 with respect to mandrel 107 but will prohibit its return movement downward.

Wedge head 163 is fixedly secured to piston cylinder 161 by means of assembly cap 165 and bolts 166 passng through cap 165 and threadedly engaging head 161b. A thin cylindrical sleeve 167 is snugly fitted over head 163 to prevent contamination and sediment from entering the wedging assembly. A more detailed view of head 163 can be obtained in FIGS. 16a and 16b. Shearable screws 168 pass threadedly through lower skirt 161a and engage in an annular channel 169 formed in piston 160 and serve to temporarily attach cylinder 161 to piston 160 to prevent premature setting from transient pressure variations or from existing hydrostatic pressure in the casing or tubing string.

A fluid pressure actuating valve seat collar 170 is threadedly attached to the lower end of adapter 154 and contains a valve seat 171 secured sealingly therein by an annular retainer ring 172 abutting a lower shoulder 170a of the collar 170 and an upper shoulder 169a of retaining sleeve 169 which is screwed into collar 170 to clamp ring 172 in place. A circular seal 173 is located between valve seat 171 and collar 170 and sealingly engages both elements. A ball valve or other suitable valve element 174 is retained at the surface while the tool is interconnected in the tubing string and lowered in the hole and the valve can be dropped through the tubing to seat in valve seat 171 when it is desirable to actuate the packer assembly. Alternatively, the valve seat collar could be attached to the other tubing string at threads 155a and this string could be utilized to actuate the packer, providing sufficient porting, is formed in the mandrel communicating with the piston and cylinder assembly. Also, a wireline plug could be utilized instead of ball valve 174.

OPERATION OF THE ALTERNATE EMBODIMENT

The packer assembly 101 is threadedly interconnected in the primary production string via threads 110a on tubing receiver 110 and threads 155a on tubing adapter 155.

A standard single packer may be located on the primary string attached to threads 155a of adapter 155 and extending below packer assembly 101. Normally the single packer is located between the two subject formations and packer assembly 101 is situated above the uppermost formation.

When the tubing string has been lowered sufficiently far into the hole to properly position the lower packer and packer assembly 101, the lower packer is set by manipulating the string or by hydraulic actuation or the lower packer may have been previously set by wireline or other methods.

A secondary tubing string 126 containing collet sleeve 118 and seal collar 124 at the lower end is lowered into the hole to contact the curved upper face 121 of dish 117 and be guided into sealed communication with bore passage 131 inside secondary mandrel 108.

A valve element 174 can then be dropped or pumped down the secondary tubing string or lowered on a wireline to seal in valve seat 171 thereby sealing off the secondary bore passage to fluid flow and allowing the operator at the surface to apply fluid pressure to the secondary string.

Actuation of the packer is achieved by the application of fluid pressure through the secondary string which pressure is contained by valve 174 and allowed to exit through one or more ports 175 through the wall of mandrel 108.

The fluid pressure then acts upward against inner differential pressure shoulder 161c of cylinder 161, is prevented from leaking upward around the shoulder by circular seal 176 between cylinder 161 and mandrel 108 and also acts downward on differential pressure area 160c on the uppermost end of upper head 160b, leakage downward being prevented by circular seal 177 between cylinder 161 and piston upper head 160b. Similar circular seals are located between mandrel 107 and cylinder 161.

The resulting hydraulic force between the two differential pressure areas drives the piston outwardly from the cylinder, shearing screws 168, simultaneously moving the cylinder and wedge assembly into abutment with the lower edge 105a of slip 105, shearing slip shear screw 153 and pivoting the slip into anchoring contact with the casing wall. As hydraulic force drives the cylinder upward, setting the slip in the casing, it also drives the piston downward pulling the mandrels downward through the slip and applying longitudinal compressive forces on the resilient packer elements.

Downward axial force from the mandrels 107 and 108 is transferred to the resilient packer elements by means of abutment of retaining keys 140 with mandrel ridges 138 and 139 and keyretaining sleeves 133 and 134. The relationship between these elements is more clearly shown in FIGS. 10, 11a, 11b and 11c.

The downward force transferred from mandrels 107 and 108 to sleeves 133 and 134 moves downward against packer plate 137 and thence into packer assembly 104 compressing it longitudinally and forcing it outward against the casing wall in sealing contact. The wedge anchors 145 and 162 maintain the telescoped position of cylinder 161 and piston 160 and also maintain the compressed orientation of packer assembly 104.

Cylinder 161 thus is locked tightly up against the bottom of slip 105 which has been fully pivoted into casing engagement position; and the packer assembly 104 is locked tightly down on top of slip 105, thereby resulting in the slip being completely locked in gripping position with the coincidental result of full expansion of the resilient packer elements 141 radially outward against the casing wall.

It should be noted that shear pins 127 have continued to maintain upper head 112 located over retaining keys 140 thereby keeping them in place in slots 140a of sleeves 133 and 134. Very little force is felt by the shear pins up to this point since the hydraulically actuated forces are transferred through the mandrels, keys 140, sleeves 133 and 134 and into head 137 bypassing head 112.

The utility of pins 127 becomes clear when describing the method of unsetting the packer apparatus for removal from the well. This is accomplished by picking up on the primary tubing string which results in imposing an upward force on head 112 threadedly attached to the tubing string via tubing receiver 110. Head 112 then moves upward on the mandrels until shear pins 127 abut annular shear shoulders 107a and 108a. Then a sufficient upward force on the tubing string will shear pins 127 across the shear shoulder and head 112 will move upward sufficiently to allow keys 140 to be wedged outward into the annular space 129b between head 129 and sleeves 133 and 134. This releases sleeves 133 and 134 from the mandrels and allows upward movement of the sleeves, head 129, the packer assembly 104 and wedge head 144 via bolts 132 and bolts 136.

Movement upward of head 129 allows the resilient packer elements to contract radially to their uncompressed state thereby unseating the packer assembly 104 from the casing. Upward movement of wedge head 144 acting through bolts 149 also pulls upward with it anchor cap 148 and the threadedly engaged dogleg bolt 150. The dogleg extension 150a contacts the upper outer edge of slip 105 and pulls it upward thereby pivoting it out of contact with the casing wall and releasing its grip. The apparatus is now completely free of the casing and, after unsetting of the lower single packer, the string can be pulled from the well.

Although certain preferred embodiments of the present invention have been herein described in order to provide an understanding of the general principles of the invention, it will be appreciated that various changes and innovations can be effected in the described multi-string packer apparatus without departure from these principles. For example, it would be possible to utilize hydraulic actuation through the primary tubing string rather than the secondary string as shown. All modifications and changes of this type are deemed to be embraced by the spirit and scope of the invention except as the same may be necessarily limited by the appended claims or reasonable equivalents thereof.

The embodiments of the invention in which an exclusive property or privilege is claimed are defined as follows:

1. A shearable ratcheting mechanism adapted to allow relative movement of coacting elements in one direction while restraining relative movement of the elements in the opposite direction, said mechanism comprising:
   a toothed slidable element;
   a shear member transverse to said slidable element and having teeth complementing said teeth on said element;
   biasing means urging said shear member against said slidable element; and,
   said teeth on said element and said teeth on said member each having a wedging surface and a restraining surface thereon.

2. The mechanism of claim 1 wherein said shear member comprises a pin having a reduced shear area near one end and said teeth on said pin are located on the end near said reduced section.

3. The mechanism of claim 2 wherein said biasing means comprises resilient spring means abutting said pin at the end opposite said teeth.

4. The mechanism of claim 3 wherein said teeth on said element and on said pin each have a restraining face generally perpendicular to the direction of sliding movement of said slidable element.

5. The mechanism of claim 4 wherein said teeth on said element and said pin each have a wedging face at sloping angle to said perpendicular faces.

6. A ratcheting shear member assembly for use on an element having a plurality of ridges each with a perpendicular face and a sloping face; said assembly comprising:
- a body member transversely slidable and engagible with the ridged element and having teeth thereon arranged to complement the ridges of the ridged element;
- biasing means abutting said body member and arranged to continuously urge said member against the ridged element; and,
- said body member having a predetermined shear section arranged to shear and part said teeth from said member upon application of a predetermined force between said member and the ridged element.

7. The assembly of claim 6 wherein said body member comprises a generally cylindrical body adapted to slide in a bore transverse to the ridged element and said biasing means comprises resilient spring means abutting said body and arranged to urge said body down the transverse bore against the ridged element.

8. A shearable, ratcheting connection assembly comprising:
- carrier body means having a main bore passage therethrough;
- an elongated slidable member adapted for relative close slidable fit in said bore passage;
- one or more transverse bore passages through said body means intersecting said main bore passage at substantially right angles thereto;
- a plurality of circumferential ridges around said elongated member, each ridge having a wedging face and a restraining face;
- a slidable shear member slidably located in each said transverse bore and arranged to contact said elongated member;
- each said shear member having ridges at one end thereon adapted for complementing engagement with said ridges on said elongated member; and,
- biasing means abutting each said shear member and arranged to continuously urge said shear member into contact with said elongated member.

9. The connection assembly of claim 8 wherein said ridges on said elongated member and on said shear member each have a face perpendicular to the longitudinal axis of said elongated member and a sloping face on the other side of said ridge from said perpendicular face.

10. The connection assembly of claim 9 wherein said main bore passage and said transverse passages are generally cylindrical; said elongated member and said shear members are generally cylindrical; and said ridged end of each said shear member is generally arcuate to match the curvature of said elongated member.

11. The connection assembly of claim 10 wherein said shear member comprises a cylindrical body section, a reduced shear section, and a ridged end formed on said shear section.

12. The connection assembly of claim 11 wherein said biasing means comprises resilient spring means abutting the radially outward end of each said shear member; and, plug means in said transverse bore, abutting said spring means, and arranged to retain said spring means urged against said shear members.

* * * * *